April 12, 1949.   H. C. HORNEMAN ET AL   2,466,895
BUTTER MANUFACTURING MEANS AND METHOD
Original Filed Dec. 13, 1941   2 Sheets-Sheet 2
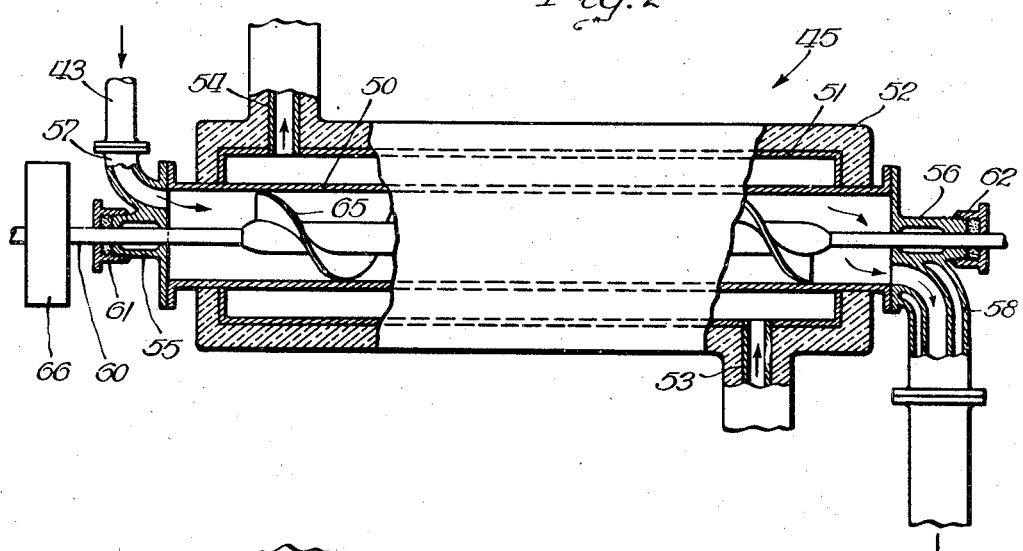
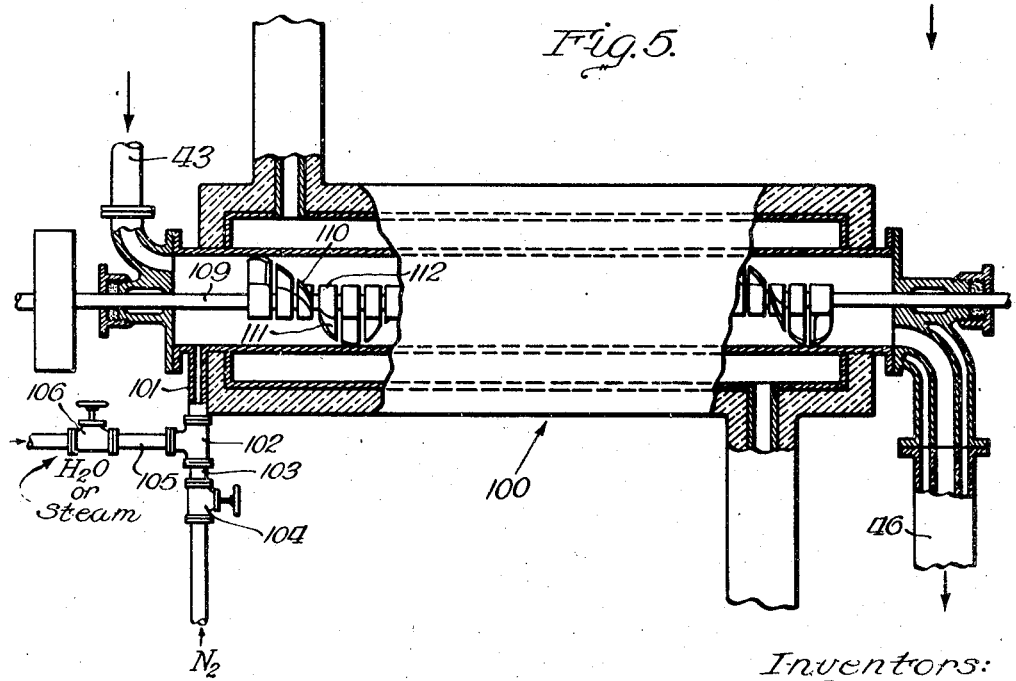
Inventors:
Herman C. Horneman
Ralph V. Hussong
Sidney N. Quam
Bernard W. Hammer
By: Norman C. H. Seletzky
Attys.

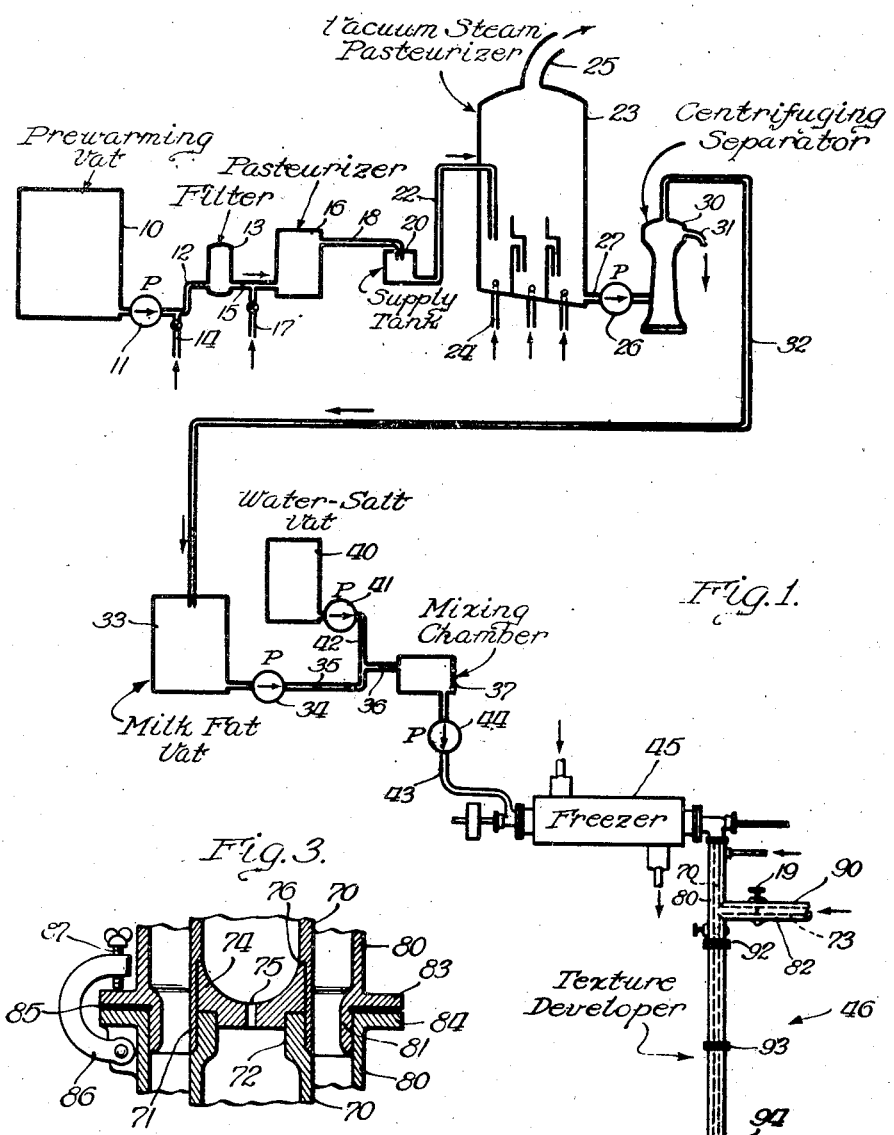
Fig. 1. Fig. 3. Fig. 4.
Inventors:
Herman C. Horneman
Ralph V. Hussong
Sidney N. Quam
Bernard W. Hammer
By: 
Attys.

_Patented Apr. 12, 1949_ 2,466,895

UNITED STATES PATENT OFFICE 2,466,895

BUTTER MANUFACTURING MEANS AND METHOD

Herman C. Horneman, Danville, Ralph V. Hussong, Urbana, and Sidney N. Quam, Danville, Ill., and Bernard W. Hammer, Oakland, Calif., assignors to Sugar Creek Creamery Company, Danville, Ill., a corporation of Delaware, and Cherry-Burrell Corporation, Chicago, Ill., a corporation of Delaware, as joint owners Original application December 13, 1941, Serial No. 422,798. Divided and this application November 2, 1945, Serial No. 626,234

18 Claims. (Cl. 99—119)

The invention relates generally to processes and apparatus for the continuous manufacture of butter and it also has particular relation to a method of and apparatus for developing true butter characteristics, such as texture, in butter made according to such continuous processes.

Substantial progress has been made in recent years in the development of continuous butter manufacturing processes. The primary object of this development has been to overcome the difficulties and objections associated with the commonly recognized prior art methods of making butter, which involve the churning of large batches of cream into butter. With the exception of the increased scale on which butter manufacturing operations by the prior art or batch method were carried out, the prior art method of manufacturing butter on a commercial scale or otherwise by churning remained essentially the same as that used by small dairy men and housewives from time immemorial.

Shortly after the advent of the production or manufacture of butter on an appreciably large commercial scale, it became apparent that a great advantage may be attainable by producing butter by a continuous process, as distinguished from the generally accepted prior art batch churning method.

It is a recognized principle of production engineering that where a product is to be produced in large quantities on a commercial scale a continuous process offers certain inherent advantages over the advantages inherent in an intermittent or batch type process. Some of the principal advantages of the continuous manufacture of a product by a continuous process are that the continuous process enables the attainment of an appreciably greater production rate in relation to the amount of equipment involved, and, what may be of even greater importance, a continuous process of manufacturing a product permits the maintenance of a high degree of standardization and control of the product. Thus, a continuous process of manufacturing butter permits the manufacture of butter having improved quality characteristics and uniformity and also permits such more desirable production at a reduced cost per unit of product.

One of the greatest difficulties encountered in the development of a satisfactory and acceptable continuous butter manufacturing process was the difficulty of obtaining a final ultimate butter product which possessed texture and other desirable characteristics which compared favorably to similar characteristics present in high quality butter expertly manufactured by the use of the conventional, intermittent or batch churning process. Although several continuous processes for the manufacture of butter which may have been suggested and developed wherein a butter-like product could be produced which, upon analysis, appeared to have a chemical composition corresponding to that of butter manufactured by the intermittent or batch process, the physical aspects of such butter products manufactured by continuous processes heretofore suggested in the prior art were, however, fundamentally different from the corresponding physical aspects or characteristics present in butter manufactured by the conventional batch churning method. Insofar as we are aware, it was not possible heretofore to produce a butter product by a continuous method or process in which the butter thus produced possessed a true butter texture and other physical and chemical butter characteristics with which the public is thoroughly familiar, and which the public associates with good butter. The consuming public has become so accustomed to using butter having a texture of the type which characterizes the butter manufactured by the intermittent or batch churning process that the absence of such texture, as well as other physical properties, in butter manufactured by heretofore known continuous processes constituted one of the major difficulties in the development of a satisfactory continuous process for the manufacture of butter.

One of the principal objects of our invention, therefore, generally stated, is the provision of an apparatus and method of developing a true and natural butter texture in butter products made according to the improved continuous buttermaking process, hereinafter described. The invention is particularly well adapted for use in connection with the continuous method of manufacturing butter, set forth in our application for United States Letters Patent Serial Number 368,750, filed December 6, 1940, and entitled "Butter process," now Patent No. 2,423,834, granted July 15, 1947.

This application is a division of our parent application Serial Number 422,798, entitled "Butter making means" which was filed December 13, 1941, now Patent No. 2,395,051.

According to one aspect of our invention, a product having the composition of butter, but not having a true or natural butter texture, may be forcibly fed through a series of restricted orifices which may be disposed at spaced apart intervals in a conduit and a true butter texture thereby developed in the product as it passes through such texturating apparatus.

The texturating apparatus is described and claimed in our parent application Serial No. 422,798.

According to another aspect of our invention, a product having the composition of butter may be converted into butter by forcibly passing the same through a chilling or freezing unit, and a further working or texturating unit.

Other aspects of the present invention pertain to the processing of the cream, which is used to produce the product having the composition of butter, prior to the conversion of the product into butter, and to the aspect of providing certain physical characteristics in the final butter product by the introduction of suitable quantities of gas into the product having the composition of butter while it is being processed into butter. Accordingly, a further object of the present invention is to provide the necessary means and method for the conversion of the product having the composition of butter into butter possessing the highly desirable qualities and characteristics of expertly made butter.

For a more complete understanding of the nature and scope of our invention, reference may be had to the following detailed description thereof, taken in connection with the accompanying drawings in which:

Figure 1 is a flow diagram of a plant wherein cream may be manufactured into butter by a continuous process of operation according to the present invention, involving the pasteurizing unit, the centrifuging unit, blending unit, chilling unit and the texturating unit;

Figure 2 is a side elevational, fragmentary view, showing the details of construction of the freezing unit forming a part of the plant shown in Figure 1 of the drawings;

Figure 3 is an enlarged, fragmentary, vertical, sectional view, taken through one of the sections between the different sections of the texture developer illustrated in Figure 1 of the drawings, and showing the details of one of the texture developing orifices provided therein;

Figure 4 is a top plan view of the orifice-providing disk in the pipe connection shown in Figure 3 of the drawings;

Figure 5 is a view similar to Figure 2 of the drawings of a modified form of freezing unit adapted to intersperse or introduce a non-toxic, smoothness-imparting gas into a product having the composition of butter as it is chilled and solidified in the freezing unit.

In the manufacture of butter by the improved continuous process, it is first necessary to obtain concentrated milk fat with the fat portion thereof in the continuous phase. In cream, which is the raw material used in the manufacture of butter, the milk fat portion of the cream is in the dispersed or suspended phase, while the water portion of the cream is in the continuous phase. Although there are several possible processes by which the phase in cream may be reversed so as to obtain the milk fat portion thereof in concentrated form with the milk fat portion in the continuous phase, the process described in our above mentioned parent application for United States Letters Patent Serial No. 422,798, and our aforementioned prior application for United States Letters Patent Serial No. 368,750, provides a very satisfactory method of obtaining such concentrated milk fat.

In Figure 1 of the drawings, the there illustrated process of obtaining concentrated milk fat with the fat portion thereof in the continuous phase, and also as disclosed in the above mentioned applications, is combined with further process steps and apparatus for the conversion of a product having the composition of butter into butter and for texturating or developing a suitable butter texture in the butter manufactured according to this invention to ultimately secure a high quality butter product.

It will, however, be understood that the texture developing aspect of the present invention is not limited solely to use in connection with the milk fat concentrating process described in this application and in our prior application for United States Letters Patent Serial No. 368,750, as is clearly pointed out in our parent application Serial No. 422,798.

Referring again to Figure 1 of the drawings, cream having a milk fat concentration of approximately 30 percent to 40 percent is warmed to a temperature of approximately 90° F. to 100° F. in a pre-warming vat 10. In the event that neutralization of the cream is desired, the cream may be neutralized, for example, in the pre-warming vat 10 in accordance with the generally accepted practice of the butter making art. From the vat 10, the pre-warmed cream is pumped by pump 11 through conduit 12 into the filter 13. Steam under a pressure of approximately 90 to 100 pounds per square inch is introduced into the conduit 12 from the steam supply line 14 connected therewith, as shown. Such introduction of steam into conduit 12 serves to further warm or heat the cream as it passes through the conduit 12, so that when the cream enters the filter 13 the temperature thereof is approximately 135° F. The cream, after passing through the filter 13, is conducted through a pipe line 15 into a flash type pasteurizer unit 16, which pasteurizer unit may, if desired, be of the well-known "Jensen" type. Steam is introduced into the conduit 15 from a steam supply line 17 associated therewith and is mixed with the filtered cream so that the filtered cream, as it enters the lower portion of the pasteurizer 16, will have a temperature of approximately 150° F. to 160° F. The cream ordinarily remains in the pasteurizer 16 for a period of time of approximately 10 to 15 seconds, during which period of time it is further heated to a temperature of approximately 190° F. to 194° F. by, for example, the indirect use of steam as is common practice in the art and in the well known "Jensen" type pasteurizer. The pasteurized cream is discharged from the upper portion of the pasteurizer unit 16 through conduit 18 into a supply or storage tank 20, from which, in turn, it is delivered to a zone of sub-atmospheric or reduced pressure or vacuum for further steam vacuum treatment in the vacuum-steam pasteurizer 23. The pasteurized cream, which has been discharged from the pasteurizer unit 16, is preferably withdrawn from the supply unit 20 through conduit 22 and at a temperature of approximately 175° F. to 190° F. into the vacuum pasteurizer 23. The vacuum pasteurizer 23 may be of various types well known in the art. For the purpose of this application, the vacuum steam type pasteurizer illustrated in Figure 1 of the drawings is similar in detail to the vacuum steam type pasteurizer disclosed in United States Letters Patent No. 2,022,420. The pressure in the vacuum steam pasteurizer 23 is a reduced or sub-atmospheric pressure and is ordinarily maintained at a vacuum of approximately 25 to 26 inches of mercury so that the temperature in the chamber 23 will be approximately 130° F. Steam under a pressure of approximately 90 pounds per square inch is introduced into the lower portion of the vacuum steam pasteurizer 23, through a number of steam pipes or orifices 24, associated with the chamber 23, as illustrated in Figure 1 of the drawings. The steam thus introduced into the chamber 23 comes into direct contact with the cream while the cream is under a reduced pressure. The desired pressures and temperatures are readily maintained in the vacuum chamber 23 by withdrawing water vapor and other volatile materials and gases from the upper portion of the chamber 23 at station 25, by means of any conventional vacuum-producing apparatus, such as a vacuum pump (not shown).

The treated cream which, in substance, has neither lost nor gained any moisture content collects in the lower portion of the chamber 23 and it is pumped therefrom by means of the pump 26 through the pipe line 27 into a centrifuging separator 30. The temperature of the cream in the separator 30 is approximately 125° F., and in each instance the temperature of the cream in the centrifuging separator 30 should be at least above the melting point of the particular type of milk fat present in the cream being centrifuged.

From the centrifugal separator 30 the emulsion or mixture containing the milk fat is discharged through the conduit 32. The emulsion or milk fat product thus discharged from the separator 30 contains approximately 80 percent to 98 percent milk fat, with the milk fat portion thereof in the continuous phase. The major portion of the skim milk and protein, which form an appreciable portion of the raw milk or cream, is separated in the centrifuging separator 30 from the portion of the raw milk or cream containing the highly concentrated milk fat in the continuous phase and is discharged from the separator 30 through the spiggot 31. The highly concentrated milk fat product, which is discharged from the separator through conduit 32, passes through the conduit into the storage tank or vat 33. From the vat 33, the emulsion or mixture containing the milk fat in the continuous phase and still in a liquid state is pumped by pump 34 through interconnected pipes 35 and 36 into a mixing chamber or unit 37. Suitable quantities of controlled aqueous solution of salt, water and starter flavor, etc., may be pumped in at a predetermined rate by pump 41 from the supply vat or reservoir 40 through conduit 42 and conduit 36 into the mixing chamber 37, wherein the controlled aqueous solution is thoroughly mixed with the incoming milk fat mixture being supplied to the mixing chamber from the vat 33.

The resulting mixture, having the composition of and intended for use in forming butter, is discharged from the mixing chamber 37 through conduit 43, and upon discharge from the mixing chamber 37 the discharged mixture contains at least 80 percent of milk fat. Pump 44 in the conduit 43 forces the standardized milk fat mixture being discharged from the mixing chamber 37 to and through the freezer or chilling unit 45. In the freezer or chilling unit 45, the liquid butter-forming mixture is solidified or chilled while being agitated so as to form a somewhat brittle, waxy, oily-tasting mass or material. Such material is discharged from the freezer or chiller unit 45 by the pressure of the incoming mixture being introduced into the freezer from the conduit 43, and in that manner is forced through the texture developer or texturator unit, identified generally by the numeral 46, in which texturator unit the texture or physical properties of the butter is improved and developed. The butter, upon leaving the texturating unit 46, is delivered to a packaging machine, generally identified by the numeral 47. The details of the construction of the freezer or chilling unit 45 and the texture developing unit 46 are described in more detail hereinafter.

It will be understood that the above detailed description of the process of obtaining concentrated milk fat in a continuous phase and manner is intended to be illustrative, and that certain other methods of obtaining concentrated milk fat in a continuous phase from cream may be used. Likewise, the temperatures and pressures mentioned above as examples in connection with the description of the preferred method of practicing the aspect of our invention pertaining to the process of manufacturing butter, together with the operation of the vacuum pasteurizer 23 and the centrifugal separator 30, are illustrative of typical operating conditions. Obviously, certain other temperatures and pressures, not specifically mentioned above, may be used when necessary depending, of course, upon other specific and related conditions.

The change in the cream during the vacuum-steam treatment above described is not fully understood. It would appear that the subjection of the cream to the sub-atmospheric or reduced pressure conditions within the chamber 23 produces an expansion of the cream and that the action of the high pressure steam, as aforementioned, when coming into direct contact with the expanded cream, modifies the milk fat globules in such a fashion that the milk fat may be separated into the continuous phase when subjected to the centrifuging action in the separator 30. It would also appear that other desirable results may be obtained when the cream, upon entering the zone of sub-atmospheric or reduced pressure in the chamber 23, has first been pre-heated to a temperature greater than the temperature of the saturated steam at the reduced pressure as used in the chamber 23. Th fact that the milk fat portion of the mixture or emulsion, discharged through conduit 32 from separator 30, is in the continuous phase indicates that the complex protein-fat hull or membrane surrounding the milk fat globules is modified physically or chemically or both by the combined vacuum and steam treatment in the chamber 23. It will, of course, be understood, however, that the present invention is not to be limited by any particular theoretical explanation as contained, for example, in this paragraph.

The addition of a controlled amount of water and the addition of the desired amount of salt and flavor starter to the concentrated milk fat in the mixing unit 37 enables the attainment of a more uniform and fine dispersion of the water, salt or brine in the milk fat to be converted into butter, with the result that the butter produced from such a mixture possesses improved physical properties, such, for example, as texture. The specific amount of water or aqueous solution added to the milk fat mixture prior to the conversion into butter varies with the percentage of milk fat in concentrated form in the vat 33, in which vat the milk fat concentration normally varies between 85 percent and 95 percent. The quantity of water or aqueous solution added to the concentrated milk fat is accurately controlled in such a manner and to such an extent that the butter finally produced normally contains at least 80 percent of milk fat.

The new and improved process of continuously manufacturing butter produces a more stable butter which, at least to some extent, may be attributable to the fine dispersion of water or brine throughout the continuous milk fat phase and to the low protein content of the milk fat converted into butter. In this latter connection, it should be noted that substantial proportion of the nitrogeneous protein material, which comprises one of the bacterial foods normally found in butter, is separated from the milk fat in the centrifugal separator 30. The new and improved process of manufacturing butter also enables the production of a more uniform butter product, due to the removal of the original water and water-soluble materials in the cream prior to the conversion of the milk fat content thereof into butter. Such an advantage is secured by separating the original non-fat materials from the cream and replacing them with controlled aqueous solutions or starter mixtures free from undesired characteristics and free from contamination. That such advantages must result will, of course, be obvious to those skilled in the art.

An additional advantage of the new and improved process of continuously manufacturing butter resides in the elimination from the process of the "churning" operation used in all batch or intermittent churning operations and carried out even today, for the most part, in bacteria-contaminated wooden churns.

In the specifications and claims, the term "starter" refers to starter culture. These cultures are well-known in the art of buttermaking and serve as flavor constituents or means for securing the desired flavor in butter. Likewise, in the specifications and claims, the term "cream" refers to the product ordinarily understood to constitute cream and in which the milk fat portion thereof is in the dispersed phase, i. e., dispersed as an emulsion in a continuous phase of non-fat milk liquids.

Referring to Figure 2 of the drawings, it will be seen that the freezer or chilling unit 45 comprises an inner cylinder 50, in which the butter-forming mixture from the mixing tank 37, as shown in Figure 1 of the drawings, is chilled and solidified. A brine or refrigerant jacket 51 is disposed around the inner cylinder 50, so that a refrigerant may be circulated in heat exchange relationship with the inner cylinder 50. The jacket 51, which forms the outer wall of the refrigerant chamber, is covered with insulation or lagging 52, and the refrigerant inlet and outlet openings 53 and 54, respectively, are provided adjacent the opposite ends of the jacket 51, as shown in Figure 2 of the drawings for the delivery to and withdrawal of refrigerant from the freezing unit 45. It has been found that chilled brine serves very satisfactorily as a refrigerant medium for use in the freezer unit 45 in the practice of the present invention.

The inner cylinder 50 of the freezing unit 45 is closed at its opposite ends by a pair of heads 55 and 56 connected in flange to flange relationship therewith in the manner shown in Figure 2 of the drawings. The head 55, attached to the left-hand or intake end of the cylinder 50, has an inlet opening or connection 57 integrally formed as a part thereof and to which the conduit 43 is connected for supplying the butter-forming mixture into the cylinder 50. The right-hand or discharge head 56 for the cylinder 50 is provided with a jacketed outlet connection 58, through which the chilled and solidified mass or material may be delivered from the interior of the cylinder 50 to the texturator or texture developing unit 46. Central openings are provided through each of the cylinder head units 55 and 56, so as to accommodate a hollow shaft 60, which fastens longitudinally through the freezer unit 45 and more specifically centrally through the chamber 50. The shaft 60 is journaled in the heads 55 and 56 in a conventional manner so as to provide suitable bearings for the shaft. A pair of stuffing boxes 61 and 62 are provided on the outer faces of each of the cylinder heads 55 and 56, whereby to secure fluid tight joints or seals about the rotatable shaft 60.

A helical screw or agitator 65 is carried on the shaft 60 within the freezing chamber 50, as clearly indicated in Figure 2 of the drawings. The function of the screw 65 is to scrape the chilled butter-forming mixture from the refrigerated inner surface of the chamber 50 wherein it is solidified and also to aid, insofar as possible, in forcibly feeding the butter-forming material from the left or intake end of the cylinder 50 to the right or discharge end of the cylinder 50 to thereby aid in completing the passage of the material through the freezer unit 45. The screw 65 also acts as an agitator for the partially solidified and partially liquid butter-forming mass in the cylinder 50, particularly during the period of time during which the material being processed in the cylinder 50 is in a liquid state. A pulley 66, keyed to the left-hand end of the shaft 60 beyond the stuffing box 61, provides the necessary means for rotatably driving the shaft 60 and the associated screw 65 carried thereon.

The shaft 60 is preferably tubular or hollow, so that a tempering medium such, for example, as hot water may be circulated therethrough for the purpose of melting off solidified butter-forming mass or material which may be frozen or adhere to the shaft 60 or on the helical screw 65. This feature of the construction is important in connection with cleaning of the frezer unit 45, for the reason that it permits substantially all of the mixture in the cylinder 50 to be discharged from the right-hand or discharge end thereof through the outlet connection 58.

As previously pointed out, the jacketed outlet connection 58 of the freezer unit 45 is connected in turn with the novel texturator or texture developing unit 46, as clearly illustrated in Figure 1 and Figure 5 of the drawings. The particular texture developing unit 46, as shown in the drawings, is preferably made in four sections, each of which sections comprises an inner tube or conduit through which the butter to be texturated is fed, and an outer jacket to enable the circulation of a heat exchange medium, such as water, in heat exchange relation with the inner tube of the texturator 46. One of the connections between the four sections of the texturator is illustrated in detail in Figure 3 of the drawings. As there shown, the lower end 71 of the inner pipe 70 of the upper section of the texturator is counterbored so as to fit over the upper end 72 of the inner pipe 70 in the next lower section. A disk element or member 74, shown in plan view in Figure 4 of the drawings, is centered between the inner-fitting pipe ends 71 and 72, as shown in Figure 3 of the drawings. The disk member 74 is provided with a restricted slot-shaped orifice 75, centrally formed therein. In the use of the illustrated procedure in the practice of the present invention, the butter being texturated is forced through the slot-shaped orifice 75 as it is fed or forced through the texturator or texture developer 46. The disk member 74 is so machined and designed that it is generally cup-shaped with a short portion formed on the bottom thereof to be fitted into the upper end of the pipe 72 with the annular shoulder abutting against the face of the upper end of the pipe 72. The upper edge of the disk member 74 is fitted accurately against and flush with a shoulder formed in the lower end of the counterbored pipe 71, as indicated at 76. The inside of the disk member 74 is preferably smoothly cupped and rounded so that there may be no sharp corners in which butter may accumulate or collect and be retained during the operation of the mechanism.

The upper pipe 70 is surrounded by a jacket section 80, having an inset skirt 81 integrally formed on the lower end thereof, and which fits accurately within the upper end of the lower jacket section 80 surrounding the lower inner pipe 70. The jacket sections 80 are provided with opposing integral flanges 83 and 84, which are separated by a gasket member 85. A number of swingable or hinged clamps 86 are carried on the lower jacket section 80 below the flange 84 and are adapted to swing up and around the flanges 83 and 84 when in operative position, as clearly shown in Figure 3 of the drawings. A set screw 87, having a wing nut head is provided in a threaded hole in each of the clamp members 86 to enable the tightening thereof against the upper face of the flange 83, as is shown in Figure 2 of the drawings. Obviously, any suitable number of clamps 86, such as 3, 4 or more, may be provided as appears necessary.

Certain other types of connections between the different sections of the texturator or texture developing unit 46 may obviously be used, and the design illustrated in Figure 3 of the drawings represents only one satisfactory design whereby the sections may be conveniently and readily taken apart for cleaning, and reassembled.

During the use of the texturating unit 46 incidental to the practice of the improved process of manufacturing butter, as herein described, warm water may be supplied into the upper end of the space between the inner tubes of the texturator and the jacket 80.

This warm water may be supplied through the annular passageway formed in an inlet connection 90 and may be withdrawn from the lower section through an outlet or discharge pipe 91. The inlet connection 90 comprises an inner pipe 73 which communicates with the inner pipe 70 in the top section of the texturator or texture developing unit 46, and an outer jacket 82, which connects into the uppermost jacket section 80. The pipe 73 is provided with a valve 19 adjacent to the inner pipe 70, as shown in the drawings. The water supplied through the annular space between the inner pipe 73 and the outer pipes 82 should preferably be at such a temperature and should preferably be circulated at such a rate that the butter being texturated, which is in immediate contact with the inner pipes 70 and 72, may be slightly warmed and perhaps even melted. Such a warming of the butter in frictional engagement with the inner pipes 70 and 72 and corresponding inner pipes of the texturator permits the butter being texturated to slip or slide easily through the texturating unit without any objectionable frictional working thereof as a result of the engagement or contact of the butter with the inner faces of the pipes 70 and 72 and like pipes of the texturator.

Disk members, similar to the disk 74, are provided in each of the three connections at stations 92, 93 and 94, between the four sections of the texturator 46, as illustrated in Figure 2 of the drawings. Each of the disks 74 may be provided with a restricted orifice which may be in the shape of a slot similar to that illustrated by the orifice 75 in Figure 4 of the drawings. Under normal conditions, it will be desirable to make the connections 92, 93 and 94 the same, so that the parts thereof, as well as the disk elements, may be interchanged.

A fourth disk element or member (not shown in particular detail) is provided at station 95 at the lower end of the texturator or texture developing unit 46, at the point where the lower section of the texturator 46 connects with an outlet fitting 96. The orifice or opening in the fourth disk member at the station or connection 95 may, if desired, be circular in cross-section instead of slot-shaped and may be somewhat smaller in net cross-section area than the cross-section area of the aforementioned orifice 75 in the aforementioned disks 74 at the connections 92, 93 and 94. For example, the slot-shaped orifice 75 in the disk member 74 (Figure 4 of the drawings) may be 1″ x $\tfrac{1}{16}$″, while the orifice in the disk member in the connection or station 95 may be $\tfrac{1}{16}$ of an inch in diameter. The pressure applied to the butter-forming mixture by the delivery pump 44, together with the action of the screw 65 in the freezer unit 45, serves to forcibly feed the solidified butter to and through the texturator or texture developing unit 46. When the butter leaves the freezer 45 it is in the form of a somewhat brittle, waxy mass, which is oily to the taste, having in mind, of course, that the mass is formed of a chilled fat product. As this mass is forced through the spaced orifices of reduced size provided in the texture developing unit or texturator 46, while this chilled butter product passes relatively slowly from orifice to orifice, a true butter texture is developed in the butter. The reason for and nature of the reaction which takes place in the butter passing through the texturator is not fully understood. In any event, however, butter having a very desirable texture is developed from what was a somewhat brittle, waxy mass or product when the butter was discharged from the freezing unit 45.

In certain instances, it may be desirable to intersperse or inject a non-toxic, smoothness-imparting gas into the liquid butter-forming mixture as it is being solidified or chilled in the freezing unit 45. In Figure 5 of the drawings, there is illustrated a modified freezing unit, generally identified by the numeral 100, in which an inert gas, such as nitrogen, may be interspersed or injected into the butter-forming mixture as it is being solidified therein. In general, the construction of the freezing unit 100 may closely follow that of the before-described freezing unit 45, as illustrated in Figure 2 of the drawings. However, the connection 101 is provided on the freezing unit 100, leading into the lower left-hand end of the receiving end of the inner freezing chamber, through which connection 101 an inert gas, such, for example, as nitrogen, may be injected into the interior of the freezing chamber. The connection 101 is connected with one side of a T-fitting 102 while the gas inlet pipe 103, having a valve 104 therein, connects with the opposite side of the fitting 102. A pipe line 105, having a valve 106 therein, is connected into the left-hand side of the T-fitting 102, and may be used from time to time as desired as an inlet for supplying warm water or steam into the freezing chamber incidental to the cleaning thereof.

In the modified freezing chamber, illustrated in Figure 5 of the drawings, there is shown a modified form of the helical screw or agitator, identified with the numeral 110. The modified helical screw 110 is preferably mounted on the tubular drive shaft 109, extending lengthwise or longitudinally through the freezer 100. The helical screw 110 is comprised of a number of short blades 111, each of which is carried on a hub member 112, secured to the drive shaft 109. The blades 111 are spaced a short distance apart one from another, but in their general outline and manner of arrangement form a helical screw corresponding generally to the helical screw 65 of the freezing unit illustrated in Figure 2 of the drawings. The spacing between the blades 111 increases the chopping or agitating action of the screw 110 and serves to more uniformly intersperse the inert gas entering the freezing chamber by way of the inlet connection 101 through the butter-forming mixture as it is being solidified within the freezing unit 100.

Obviously, certain further changes in the apparatus hereinbefore described may suggest themselves to those skilled in the art and different embodiments of the invention pertaining to the apparatus for the continuous manufacture of butter may be made without departing from the scope of our invention. It is intended that all matters described hereinbefore, pertaining to the improved process and apparatus, or as illustrated in the accompanying drawings, should be interpreted as illustrative only of applicants' invention.

The invention is hereby claimed as follows:

1. Means for converting a butter-forming mixture of liquid milk fat and water, which may include salt and flavor starter in desired amounts, into butter which comprises, in combination, freezer means wherein the liquid butter-forming mixture may be solidified, texture developing means wherein the solidified mixture may be given a true butter texture, said texture developing means comprising, conduit means with orifice means therein, and means for moving the butter-forming material in its different stages of conversion through the various parts of the converting means.

2. Means for converting a butter-forming mixture of liquid milk fat and water, which may also include salt and flavor starter in desired amounts, into butter, which comprises, in combination, a combined freezer and gas interspersing unit wherein the liquid butter-forming mixture may be solidified and have non-toxic smoothness-imparting gas interspersed therethrough, texture developing means wherein the solidified mixture may be given a true butter texture, said texture developing means comprising, conduit means with orifice means therein, and means for moving the butter-forming material in its different stages of conversion through the various parts of the converting means.

3. In a continuous process of making butter, the method of converting a butter-forming mixture of liquid milk fat and water, which may also include salt and flavor starter, into butter which comprises, solidifying the liquid butter-forming mixture into a brittle waxy mass, and developing a true butter texture in said brittle waxy mass by forcing it through restricted orifice means.

4. In a continuous process of making butter, the method of converting a butter-forming mixture of liquid milk fat and water, which may also include salt and flavor starter in desired amounts, into butter which comprises, solidifying the liquid butter-forming mixture into a brittle waxy mass while interspersing a non-toxic smoothness-imparting gas therethrough, and developing a true butter texture in said brittle waxy mass by forcing it through restricted orifices.

5. A continuous butter making process which comprises, subjecting cream containing milk fat in the dispersed phase to reduced pressure, subjecting the cream while at the reduced pressure to the direct action of steam, concentrating the milk fat by subjecting the treated cream while at a temperature above the melting point of said fat to a centrifuging action, separating the concentrated milk fat in the continuous phase from the other constituents of said cream, mixing the milk fat with water and desired amounts of salt and flavor starter in such proportions as to provide a butter-forming mixture, solidifying the liquid butter-forming mixture into a brittle waxy mass, and developing a true butter texture in said brittle waxy mass by forcing it through restricted orifice means.

6. A continuous butter making process which comprises, introducing cream into a zone of sub-atmospheric pressure at a temperature substantially greater than the temperature of saturated steam at said pressure, subjecting the cream while at the reduced pressure to the direct action of high pressure steam, separating out the milk fat of said cream into the continuous phase by subjecting the treated cream while at a temperature above the melting point of said fat to a centrifuging action, mixing the milk fat which is in the continuous phase with water and desired amounts of salt and flavor starter in such proportions as to provide a butter-forming mixture, solidifying the liquid butter-forming mixture by chilling so as to convert it into a brittle waxy mass, and developing a true butter texture in said mass by forcibly feeding the same through a series of restricted orifice openings.

7. A continuous process of making butter which comprises, introducing pasteurized cream at a temperature of around 175° F. to 190° F. and containing from about 30 percent to 40 percent milk fat in the dispersed phase into a zone of sub-atmospheric pressure, subjecting the cream while at the reduced pressure to the action of high pressure steam, withdrawing water vapor from said zone so as to prevent an increase in said sub-atmospheric pressure and maintain a temperature of about 130° F. to 135° F. within said zone, concentrating the milk fat by subjecting the treated cream while at a temperature of around 125° F. to a centrifuging action, separating the resulting concentrated fat containing about 85 percent to 95 percent milk fat in the continuous phase, mixing the concentrated milk fat which is in the continuous phase with water and desired amounts of salt and flavor starter in such proportions as to provide a butter-forming mixture, solidifying the liquid butter-forming mixture by freezing so as to convert it into a brittle waxy mass, and developing a true butter texture in said mass by forcibly feeding the same through a series of restricted orifices.

8. Means for converting a butter-forming mixture of liquid milk fat in the continuous phase and water, which may also include salt and flavor starter in desired amounts, into butter, which comprises, in combination, a combined chilling means and gas interspersing unit wherein the liquid butter-forming mixture may be chilled and have non-toxic smoothness-imparting gas interspersed therethrough, and texture developing means wherein the chilled mixture may be given a true butter texture.

9. Means for converting a butter-forming mixture of liquid milk fat in the continuous phase and water, which may include salt and flavor starter in desired amounts, into butter, which comprises, in combination, chilling means wherein the liquid butter-forming mixture may be chilled, texture developing means wherein the chilled mixture may be given a true butter texture, jacket means around at least a part of said texture developing means, means for circulating a fluid of controlled temperature through said jacket means so as to control the temperature of the butter-forming mixture in said texture developing means, and means for moving the butter-forming material in its different stages of conversion through the various parts of the converting means.

10. A continuous process of making butter which comprises, subjecting cream containing milk fat in the dispersed phase to reduced pressure, subjecting the cream while at the reduced pressure to the direct action of steam, concentrating the milk fat by subjecting the treated cream while at a temperature above the melting point of said fat to a centrifuging action, separating the concentrated milk fat in the continuous phase from the other constituents of said cream, mixing the milk fat with water and desired amounts of salt and flavor starter in such proportions as to provide a butter-forming mixture, solidifying the liquid butter-forming mixture into a brittle waxy mass while interspersing a non-toxic smoothness-imparting gas therethrough, and developing a true butter texture in said brittle waxy mass by forcing it through restricted orifices.

11. A process of producing butter, comprising heating cream to at least a milk fat melting temperature and breaking the normal milk fat in milk serum phase relation in the emulsion of the cream to produce a mixture wherein the milk fat in milk serum phase is reversed and wherein the milk fat and milk serum portions are in unstable readily separable relationship, separating a fraction from the destabilized cream containing a high concentration of milk fat in the continuous phase, adding butter composition ingredients to the fraction containing the high concentration of fat in amounts necessary to produce the desired butter composition therein, thoroughly intermingling the added ingredients and the separation fraction containing the high concentration of fat, subjecting the thoroughly intermingled mixture to simultaneous agitation and cooling to crystallize at least a substantial part of the milk fat content thereof, and developing a true butter texture in the cooled butter by forcibly feeding the same through a conduit including restricted orifice means.

12. A process of producing butter, comprising heating cream to at least a milk fat melting temperature and breaking the normal milk fat in milk serum phase relation in the emulsion of the cream to produce a mixture wherein the milk fat in milk serum phase is reversed and wherein the milk fat and milk serum portions are in unstable readily separable relationship, separating a fraction from the destabilized cream containing a high concentration of milk fat in the continuous phase, adding butter composition ingredients to the fraction containing the high concentration of fat in amounts necessary to produce the desired butter composition therein, thoroughly intermingling the added ingredients and the separation fraction containing the high concentration of fat, subjecting the thoroughly intermingled mixture to simultaneous agitation and cooling to crystallize at least a substantial part of the milk fat content thereof while interspersing a non-toxic smoothness-imparting gas therethrough, and developing a true butter texture in said plastic butter mass by forcing it through a passage so constructed and arranged as to produce relative motion between the crystallized fat portions thereof.

13. A process for producing butter from cream, comprising heating the cream to at least a milk fat melting temperature, subjecting the heated cream to forces effective to break the normal milk fat in milk serum emulsion and to produce a reverse phase milk serum in milk fat mixture having its milk fat and milk serum portions in unstable readily separable relation, separating the mixture to produce a portion having a high milk fat concentration, adding butter composition standardizing ingredients to the portion containing the high milk fat concentration in an amount necessary to produce the desired butter composition therein, thoroughly intermingling the standardizing ingredients and the separation fraction containing the high concentration of milk fat, then simultaneously cooling and stabilizing the standardized mixture to thoroughly cool and stabilize the components thereof and to crystallize at least a substantial portion of the milk fat content thereof while interspersing a non-toxic smoothness-imparting gas therethrough, and developing a true butter texture in the cooled butter mass by forcing it through a passage including a restricted orifice.

14. A coordinated apparatus for the continuous production of butter, comprising, in combination, means for destabilizing a dairy product containing milk fat in the dispersed phase, means for separating a substantial portion of the milk fat from the destabilized dairy product to produce a separation fraction having a high milk fat concentration in the continuous phase, cooling and working means for simultaneously cooling and working the separation fraction containing the high concentration of milk fat to produce butter in which at least a substantial portion of the milk fat is crystallized, texture developing means including restricted orifice means for developing a true butter texture in the cooled butter, and connecting and circulating means for connecting all in series in the order mentioned and for causing the circulation therethrough of the product being processed.

15. A coordinated apparatus for the continuous production of butter, comprising, in combination, means for destabilizing a dairy product containing milk fat in the dispersed phase, means for separating a substantial portion of the milk fat from the destabilized dairy product to produce a separation fraction having a high milk fat concentration in the continuous phase, means for introducing predetermined quantities of butter composition standardizing ingredients into the separation fraction containing the high concentration of milk fat, cooling and working means for simultaneously cooling and working the separation fraction containing the high concentration of milk fat to produce butter in which at least a substantial portion of the milk fat is crystallized, texture developing means including restricted orifice means for developing a true butter texture in the cooled butter, and connecting and circulating means for connecting all in series in the order mentioned and for causing the circulation therethrough of the product being processed.

16. A coordinated apparatus for the continous production of butter, comprising, in combination, means for destabilizing a dairy product containing milk fat in the dispersed phase, means for separating a substantial portion of the milk fat from the destabilized dairy product to produce a separation fraction having a high milk fat concentration in the continuous phase, means for introducing predetermined quantities of butter composition standardizing ingredients into the separation fraction containing the high concentration of milk fat, mixing means for thoroughly intermingling the standardizing ingredients and the separation fraction containing the high concentration of milk fat, cooling and gas-interspersing means for simultaneously cooling and working the butter mixture and interspersing a non-toxic smoothness-imparting gas therethrough to produce butter in which at least a substantial portion of the milk fat content is crystallized, texture developing means including restricted orifice means for developing a butter texture in the cooled product, and connecting and circulating means for connecting all in series in the order mentioned and for causing the circulation of the product being processed therethrough.

17. A method of preparing butter, including commingling an inert gas and a liquid butter mixture in desired proportions, continuously forcing a stream of the same through a processing chamber under super-atmospheric pressure while simultaneously cooling and working the mixture to a low temperature while passing through said chamber to partially crystallize some of the butterfat content thereof, conducting the cooled stream of butter from said chamber into and through a texture developing means including means having a restricted passage therethrough to produce a true butter texture therein and to facilitate the substantial completion of the major portion of the crystallization of the fat crystallizable at the temperature to which the product was cooled.

18. A coordinated apparatus for continuously producing butter, comprising the combination of means for destabilizing a dairy product containing milk fat in the dispersed phase, separating means for separating a substantial portion of the milk fat from the destabilized dairy product to produce a separation fraction having a high milk fat content in the continuous phase, and cooling and agitating means for cooling and concurrently agitating the separated portion of the dairy product containing the high concentration of milk fat to produce butter in which at least a substantial portion of the milk fat is crystallized, and texture developing means including orifice means to receive the cooled butter and to develop a true butter texture therein, and connecting and circulating means connecting all in series in the order mentioned and for causing the circulation therethrough of the product being processed.

HERMAN C. HORNEMAN.
RALPH V. HUSSONG.
SIDNEY N. QUAM.
BERNARD W. HAMMER.

REFERENCES CITED

The following references are of record in the file of this patent:

UNITED STATES PATENTS

| Number | Name | Date |
|---|---|---|
| 1,039,627 | Witte | Sept. 24, 1912 |
| 1,155,055 | Gray | Sept. 28, 1915 |
| 1,384,318 | Heath | July 12, 1921 |
| 1,791,069 | Wendt | Feb. 3, 1931 |
| 2,013,025 | Bottoms et al. | Sept. 3, 1935 |
| 2,150,943 | Sharples | Mar. 21, 1939 |
| 2,168,376 | Meulen et al. | Aug. 8, 1939 |
| 2,206,419 | Miller | July 2, 1940 |
| 2,299,440 | Meulen et al. | Oct. 20, 1942 |
| 2,395,051 | Horneman et al. | Feb. 19, 1946 |
| 2,423,834 | Horneman et al. | July 15, 1947 |

OTHER REFERENCES

Hunziker, "The Butter Industry," third edition, published by the author, La Grange, Illinois (1940), pages 304–309.